C. S. GRANNIS.
GEAR CUTTING MACHINE.
APPLICATION FILED AUG. 14, 1912.

1,097,222.

Patented May 19, 1914.
7 SHEETS—SHEET 1.

C. S. GRANNIS.
GEAR CUTTING MACHINE.
APPLICATION FILED AUG. 14, 1912.

1,097,222.

Patented May 19, 1914.
7 SHEETS—SHEET 3.

C. S. GRANNIS.
GEAR CUTTING MACHINE.
APPLICATION FILED AUG. 14, 1912.

1,097,222.

Patented May 19, 1914.

UNITED STATES PATENT OFFICE.

CHARLES S. GRANNIS, OF SYRACUSE, NEW YORK, ASSIGNOR TO NEW PROCESS RAW HIDE COMPANY, OF SYRACUSE, NEW YORK, A CORPORATION OF NEW YORK.

GEAR-CUTTING MACHINE.

1,097,222.   Specification of Letters Patent.   Patented May 19, 1914.

Application filed August 14, 1912. Serial No. 715,013.

*To all whom it may concern:*

Be it known that I, CHARLES S. GRANNIS, of Syracuse, in the county of Onondaga, in the State of New York, have invented new and useful Improvements in Gear-Cutting Machines; of which the following, taken in connection with the accompanying drawings, is a full, clear, and exact description.

This invention relates to certain improvements in machines for cutting the teeth of spur gears to approximately the correct form from previously prepared gear blanks of limited face width, said gears to be finished to exact form in the finishing machine shown in my pending application No. 688,496, filed April 4, 1912.

The main object is to provide simple means for automatically and accurately cutting the teeth of a gear directly from the blank to approximately involute form by rolling such blank along an imaginary plane tangential to the pitch-circle of the gear intersecting the cutting edges of the cutters at right angles to a medial plane between them so as to cause the cutters to operate simultaneously upon a series of teeth at each forward and return movement of the gear-supporting carriage. In other words, I have sought to roll the gear blank along the tangent of its pitch-circle into cutting engagement with a pair of rotary cutters adjusted to conform to the pitch of the gear and constituting what may be termed a tooth-cutting rack capable of producing or generating teeth of involute form as the gear is reciprocated and rolled along the tangent of its pitch-circle, thereby establishing a perfect mesh with the tooth-cutting rack and assuring a correspondingly perfect mesh and noiseless running with any companion gear or rack of the same pitch when finished by the finishing machine previously mentioned.

Another object is to provide simple means for automatically rotating the gear step by step to enable the teeth to be successively cut and finished in one and the same machine without removal therefrom.

A further object is to enable the cutters to be adjusted to different angles and also toward and from the axis of the gear-supporting spindle so that the same machine may be used for cutting gears of different pitch and also of different size.

Other objects and uses relating to specific parts of the machine will be brought out in the following description.

In the drawings, Figs. 9 and 10 are detail sectional views taken respectively on lines 9—9 and 10—10, Fig. 1; Fig. 9 showing a portion of the means for transmitting motion from the main driving shaft to one of the cutter-heads, while Fig. 10 is enlarged and shows the means for adjusting one of the cutter-heads axially.

Figure 9:
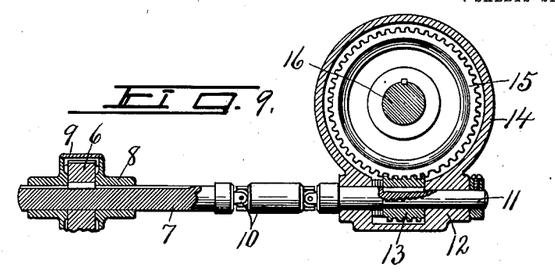

This machine comprises a main supporting frame —1— of cast metal or other suitable material having the upper portion of its rear side provided with journal bearings —2— for receiving a horizontally disposed driving shaft —3—, to the central portion of which is secured a tight pulley —4— adapted to be connected by a belt to any available source of power not necessary to herein illustrate or describe. The driving shaft —3— extends from side to side of the frame and its opposite ends are connected by spiral gears —5— and —6— to superposed forwardly extending counter-shaft sections —7— having their rear ends journaled in suitable bearings —8— forming parts of gear cases —9—. The gears —6— are held against axial movement by their respective cases —9— and are feathered or splined upon their shaft sections —7— so as to impart rotary motion thereto and, at the same time, to permit the said shaft sections —7— to slide axially in shifting the gear-cutters to which they are connected in a manner hereinafter described. These shaft sections —7— are connected by universal couplings —10— to additional forwardly projecting shaft sections —11— which are journaled in suitable bearings —12— on opposite sides of the machine as shown more clearly in Figs. 2, 3, and 9, so that the corresponding shaft sections —7— and —11—, together with their universal couplings, —10—, constitute flexible counter-shafts. The forward ends or sections —11— of these flexible shafts are provided with worms —13— secured thereto by suitable keys and held against axial movement between the adjacent ends of their respective bearings —12— which form part of gear cases —14— for housing the worm —13— and suitable worm gears —15— meshing therewith. The worm gears —15— are secured to the outer ends of separate horizontally disposed cutter-head spindles —16— arranged at an angle with each other and having their inner ends provided with cutter-heads —18— for cutting the teeth of a gear as —a— shown by dotted lines in Figs. 1 and 7 and by full lines in Fig. 2.

The bearings —17— preferably consist of cast metal sleeves having their outer ends provided with the housings —14— for the worm gears —15— and their inner ends pivoted by bolts —19— to separate underlying supporting beds —20—, said bearings being provided with rearwardly projecting base plates —21— having curved rear edges —22— concentric with the pivotal bolt —19— and movable along suitable graduations —23— and —23— to indicate the degree of angular adjustment of either of the cutter spindles. The base plates are provided with one or more elongated slots —24— also concentric with the pivotal bolt —19— for receiving suitable clamping bolts —25— by which the bearings —17— and their cutter-supporting spindles may be held in their angularly adjusted positions. In addition to this angular adjustment of the cutter-heads and their supporting spindles relatively to each other for the purpose of bringing their converging cutting faces to the proper angle for cutting gears of predetermined pitch, they are also adjustable toward and from each other and in parallel lines and are still further adjustable forwardly and rearwardly to operate upon gears of different sizes and for these purposes, the supporting beds —20— are slidable laterally toward and from each other along suitable ways on the upper sides of separate supporting plates —27— which in turn are movable forwardly and rearwardly along ways —28— on the upper side of the main supporting frame —1— at the rear of the carriage for the gear supporting spindle presently described.

Figure 14:
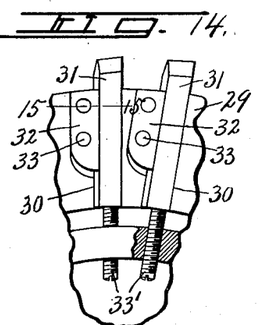
Fig. 14 is an enlarged face view of a portion of one of the cutter heads showing two of the cutter knives and adjusting means therefor.
Figure 15:
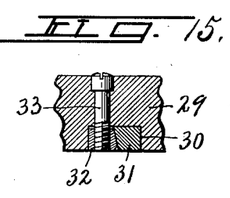
Fig. 15 is an enlarged sectional view through a portion of the cutter-head and one of the cutters taken on line 15—15, Fig. 14.

Each cutter-head —18— is provided with a circular detachable disk or plate —29— having a circular series of radial grooves —30— in its inner face, spaced uniform distances apart, for receiving a corresponding number of radial cutter bars or knives —31— which are held in place by separate clamping blocks —32— and bolts —33— and are adapted to be adjusted radially or endwise by adjusting screws —33′— as shown more clearly in Fig. 14. The outer ends of the cutters —31— project some distance beyond the periphery of the disk —29— and are spaced uniform distances apart, thereby forming a series of cutting teeth of suitable form. The adjacent faces of the cutter teeth are disposed at acute angles to the axes of their respective cutter-heads while their opposite faces are disposed at right angles to such axes, the adjacent faces of the teeth of the opposed cutter-heads being spaced apart at the side adjacent the gear blank operated upon a sufficient distance to receive one tooth of the gear between them and constitute what may be termed a tooth-cutting rack with which the gear blank is adapted to be brought into rolling mesh as it is reciprocated and simultaneously rotated in the manner hereinafter described.

Figure 10:
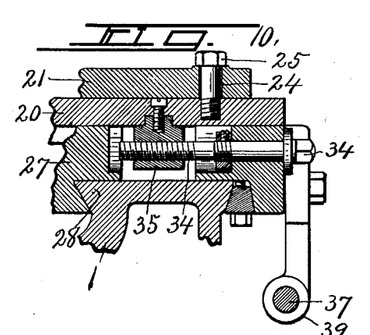
Figure 11:
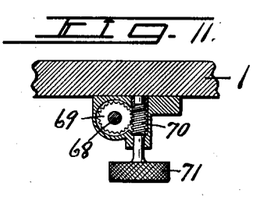
Figs. 11 and 12 are enlarged detail sectional views of the tape tightening means taken on lines 11—11 and 12—12, Fig. 3.
Figure 12:
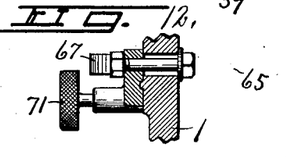

The supporting beds —20— for the cutter bearings may be adjusted along their respective ways independently of each other by separate adjusting means as screws —34— which are rotarily mounted in suitable bearings in the forwardly and rearwardly sliding plates —27— and are held against axial movement by suitable collars as shown more clearly in Fig. —10—, the inner ends of the screws being engaged with nuts —35— on the under sides of the sliding beds —20—. These screws —34— are preferably coaxial transversely of the machine and their outer ends protrude beyond the corresponding outer sides of the plates —27— and are angular in cross section for the reception of a suitable wrench or similar device whereby they may be rotated to effect the adjustment of the beds —20— in the manner previously described.

The cutter-heads, including their supporting spindles and bearings therefor, are adapted to be adjusted by hand about the axes of their respective pivotal bolts —19— when the clamping bolts —25— are loosened, said clamping bolts being retightened when the cutter-heads are brought to the desired angle. The object of these adjustments is to properly position the cutting edges of the cutters for gears of different pitch or size, the object of the independent adjustment of either cutter-head being to compensate for any inequality of wear of the cutters.

Figure 1:
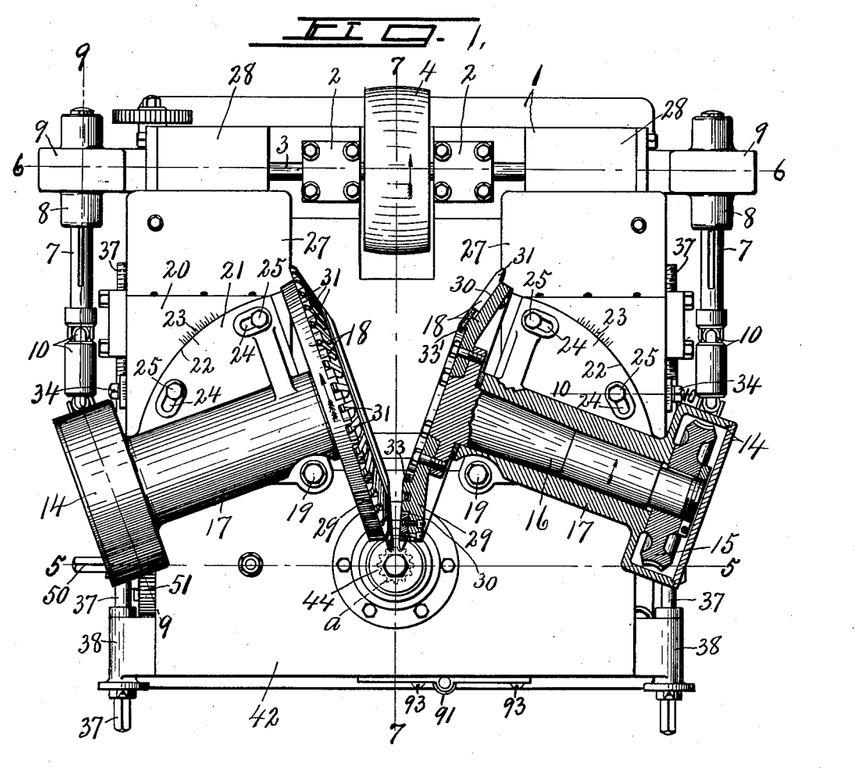
Figures 1 and 2 are respectively a top plan and a front elevation of a gear-cutting machine embodying the various features of my invention, a portion of the front of the main supporting frame being broken away in Fig. 2 to show the cam for reciprocating the carriage for the gear-supporting spindle.
Figure 2:
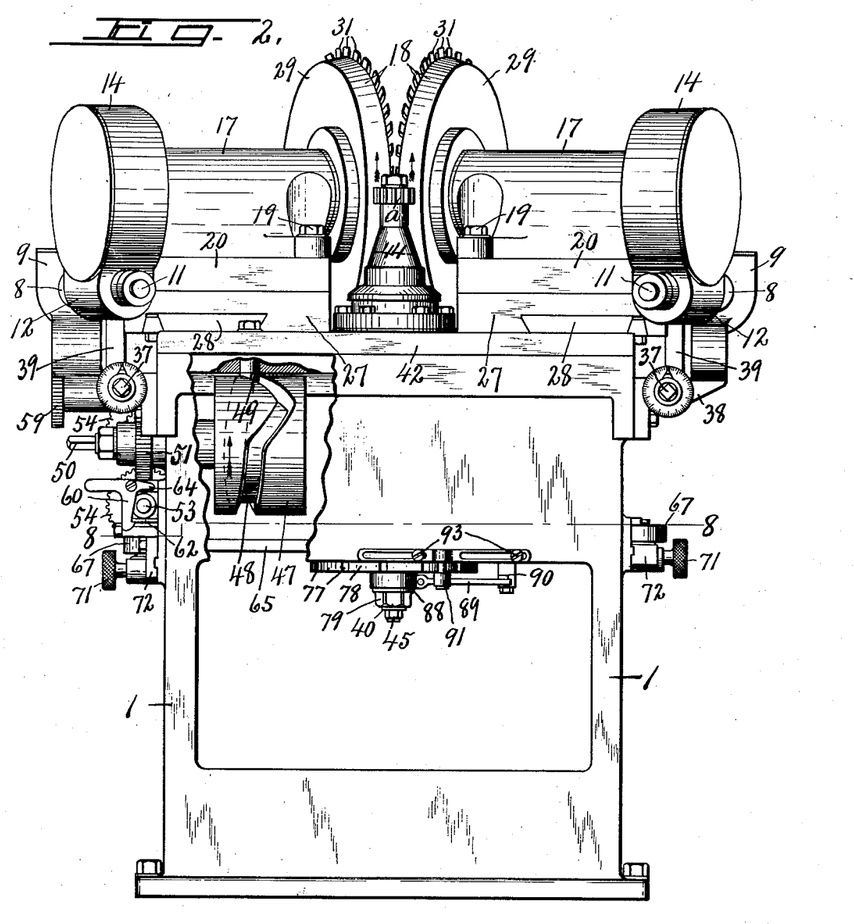
Figure 3:
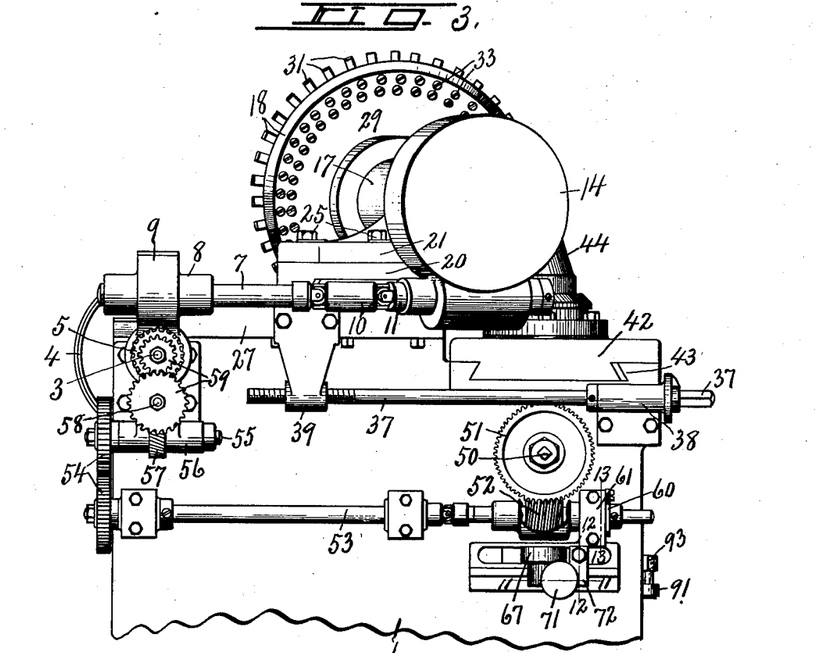
Fig. 3 is an end view of the upper portion of the machine shown in Figs. 1 and 2, a portion of the case for the worm gear being broken away.
Figure 4:
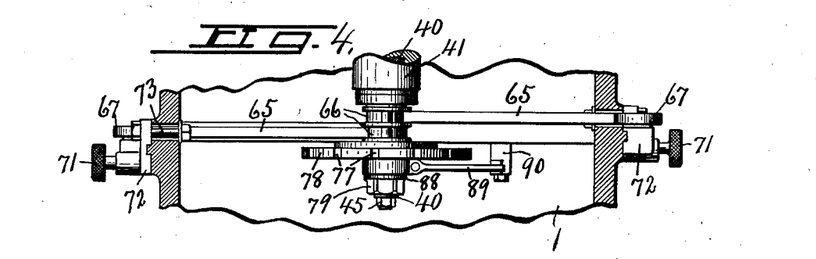
Fig. 4 is a front elevation of the lower end of the gear supporting spindle showing the tape drums and tapes for imparting rotary motion to the spindle as the latter is reciprocated transversely of the machine and showing also the means for tensioning the tapes together with the index plate.

The means for adjusting the cutter-heads forwardly and rearwardly toward and from the axis of the gear supporting spindle to enable the machine to operate upon gears of different size, consists of separate screws —37— which are journaled in suitable bearings —38— on opposite sides of the front portion of the machine as is shown more clearly in Figs. 1, 2, and 3, and extend rearwardly therefrom, the rear ends of said screws being threaded and engaged with suitable nuts —39— on the outer sides of the plates —27—, said screws being held against endwise movement by suitable collars engaging opposite ends of the bearings —38— and their front ends are preferably angular for the reception of a suitable wrench or equivalent whereby the screws may be rotated at will.

Figure 5:
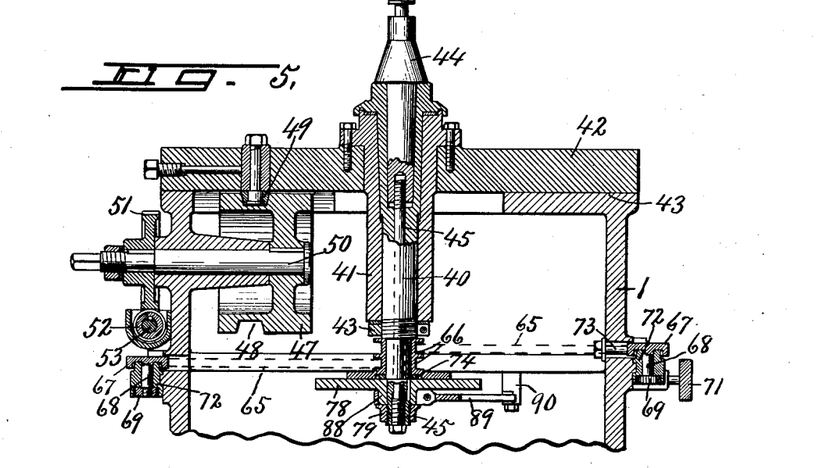
Figs. 5 and 6 are longitudinal vertical sectional views through the front and rear portions of the machine taken respectively on lines 5—5 and 6—6, Fig. 1.
Figure 6:
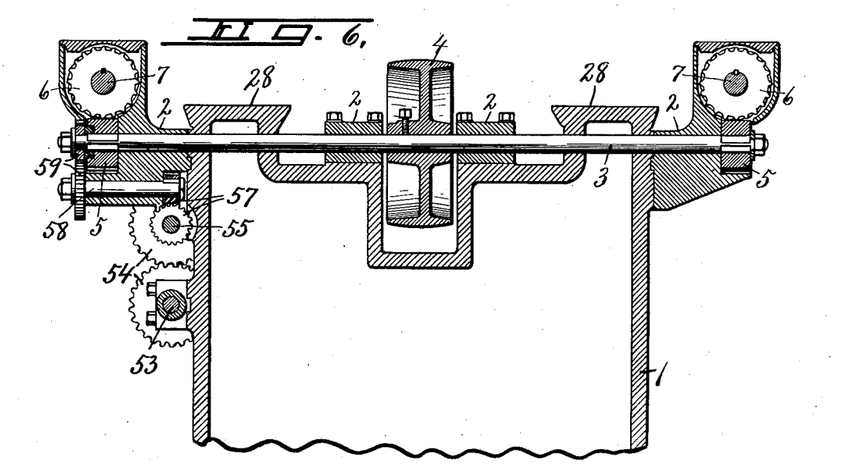
Figure 7:
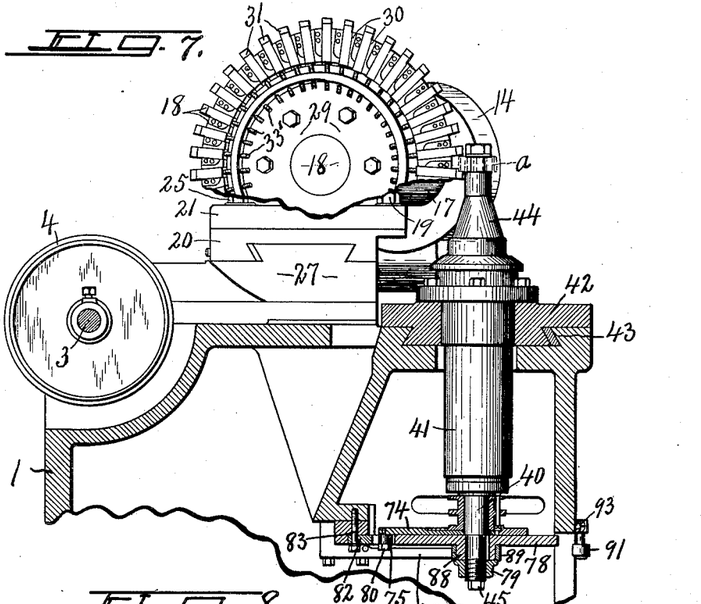
Fig. 7 is a transverse vertical sectional view through the same machine from front to rear taken on lines 7—7, Fig. 1, except that the bearing sleeve for the gear-supporting spindle is shown in elevation.

The gear blanks —a—, which are to be cut, are clamped upon the upper end of a vertically disposed rotary spindle —40— which is journaled in a suitable sleeve —41— on a tranversely movable carriage —42— as shown more clearly in Figs. 6 and 7, the carriage —42— being movable in suitable ways —43— on the upper side of the front portion of the main supporting frame —1— as shown more clearly in Figs. 3 and 7. The spindle —30— is fitted with a tapering fit in the sleeve —41— and its lower end is threaded and engaged by an adjusting nut —43— engaging the lower end of the sleeve to take up wear and assure a close running fit between the spindle and sleeve. The upper end of the spindle is provided with a tapering socket for receiving the tapering shank of a mandrel —44— to which the gear blank is directly secured, the tapering shank of the mandrel being tightly fitted in the socket and held in its position by a double threaded screw —45— extending downwardly through a central opening in the spindle and having its lower end angular in cross section for receiving a wrench or similar tool by which it may be turned. The lower end of this screw is threaded and engaged with an internal thread in the adjacent end of the spindle while the upper end of the screw is provided with a thread of slightly steeper pitch and engaged in an internally threaded socket in the lower end of the tapering shank of the mandrel —44— as shown more clearly in Fig. 5 so that when the screw is rotated in one direction, as to the right in tightening, the steeper pitch of the upper end of the thread will draw the tapering shank of the mandrel —44— in the corresponding tapering shank of the spindle thereby frictionally holding the mandrel against relative rotation. It is evident that the steeper pitch of the upper end of the screw will cause the release or loosening of the tapering shank of the mandrel and permit it together with the gear thereon to be withdrawn from the spindle when the screw is disengaged therefrom. The gear supporting spindle is adjusted so as to hold the spindle in substantially the same horizontal plane as the axes of the cutter-heads.

The carriage —42— for the gear supporting spindle is automatically reciprocated back and forth transversely of the machine a sufficient distance to move the gear across and to opposite sides of the cutting edges of the cutters and simultaneously with this reciprocatory movement of the carriage, the gear supporting spindle and gear thereon are rotated at the same rate of speed and in the same direction as though in intermeshing engagement as if actuated by intermeshing engagement with the teeth of the cutters or with a rack similarly positioned, thereby establishing a rolling contact with the cutting edges of the cutters along the tangent of the pitch-circle of the gear intersecting the cutters at right angles to a medial line between the cutter-heads for the purpose of cutting the sides of the teeth to accurate involute form.

*Carriage reciprocating means.*—The means for reciprocating the carriage consists of a rotary member —47— having a cam groove —48— which receives a stud or roller —49— on the underside of the carriage —42—, the rotary member —47— being secured to a shaft or spindle —50— which is journaled in a suitable bearing on the upper left hand side of the main supporting frame —1— as shown more clearly in Fig. 5, the outer end of the shaft being angular in cross section for the reception of a suitable wrench or equivalent whereby it, together with the cam —47— may be rotated by hand to reciprocate the carriage —42— at will if desired under certain conditions hereinafter described.

Secured to the outer end of the shaft or spindle —50— is a worm gear —51— meshing with an underlying worm —52— on the front end of a rearwardly extending flexible shaft —53—, the latter having its rear end connected by gears —54— to a superposed shaft —55— which is journaled in suitable bearings —56— on the adjacent side of the main supporting frame —1—. The shaft or spindle —55— is connected by spiral gears —57— to a superposed spindle —58— which is also journaled in suitable bearings on the adjacent side of the main supporting frame and is connected by gears —59—to the main driving shaft —3— as shown more clearly in Figs. 3 and 6.

The gears, forming a part of the connection between the main driving shaft —3— and cam —47—, are adjusted to rotate said cam at a relatively slow speed thereby causing a correspondingly slow reciprocatory action of the carriage —42—.

The flexible shaft —53— is composed of sections arranged end to end and connected by a universal coupling at the rear end of the worm —52— so as to allow the section upon which the worm is mounted to move vertically for the purpose of throwing the worm into and out of mesh with its companion gear —51— thus permitting the manual rotation of the cam —47— and incidental reciprocation of the carriage —29— when the worm —52— is thrown out of mesh with the gear —51—.

Figure 13:
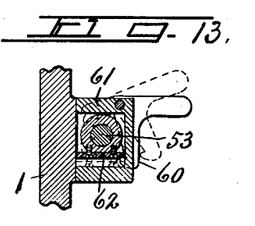
Fig. 13 is an enlarged detail sectional view of the device for throwing the worm of the cam driving mechanism into and out of operative connection with its gear, said section being taken on line 13—13, Fig. 3.

The shaft section upon which the worm —52— is mounted is normally held in operative connection with the gear —51— by means of a hand operated locking pawl —60— which is pivoted to a laterally projecting bearing —61— on the main supporting frame as shown more clearly in Figs. 2, 3, and 13, and movable into and out of locking engagement with the under side of a bearing —62— in which the front end of the shaft —53— is journaled, said pawl being provided with an additional extension —64— overhanging said bearing and adapted to positively force the adjacent end of the shaft downwardly to disengage the worm —52— from its companion gear —51— when the pawl is thrown out of locking engagement with the under side of said bearing although it is evident that the weight of the worm and its supporting section of the flexible shaft is ordinarily sufficient to cause the worm to gravitate out of engagement with the gear when the pawl —60— is thrown from its locking position.

*Gear rolling and indexing.*—The means for rotating the gear supporting spindle simultaneously with the reciprocation of the carriage —42— upon which such spindle is mounted for producing a rolling motion of the gear along a tangent of its pitch-circle at right angles to the medial line between the cutter-heads consists of a pair of steel tapes —65— having their inner ends attached to and reversely wound upon the peripheries of a pair of coaxial drums —66— and extending in opposite directions tangential to one and the same side of said drums, the outer ends of the tapes being attached to the peripheries of separate disks —67— which are mounted in suitable bearings on opposite sides of the main supporting frame —1— as shown more clearly in Figs. 2, 4, 5, 8, and 16.

The tape drums —66— are secured together end to end (preferably integral) and are loosely mounted upon the lower end of the gear supporting spindle —30— but are normally locked thereto by suitable mechanism hereinafter described except for a brief interval during the reciprocation of the carriage —42— when the gear is being adjusted rotarily one tooth space in cutting the teeth successively. The diameters of these tape drums are the same as the pitch diameter of the gear which is being operated upon while the tapes are attached to the same sides of the drums as that of the gear which is adjacent the cutter-heads and are therefore disposed in a vertical plane tangential to the pitch-circle of the gear intersecting the cutting edges of the cutters at their points of engagement with the gear, it being understood that the drums are changed to correspond to gears of different sizes.

The tapes —65— are adapted to be drawn up tightly and for this purpose the disks —67— are secured to separate rotarily adjusted spindles —68— which are journaled in suitable bearings on the adjacent sides of the main supporting frame —1— and are provided with worm gears —69— meshing with suitable worms —70—, the latter being also journaled in suitable bearings in the adjacent sides of the main supporting frame and provided with hand wheels —71— by which they may be rotated to tighten the tapes or adjust them to different sizes of drums and also to different sizes of disks —67— which must conform to the diameter of the drums. For this latter purpose, the disks —67— and their adjusting means are mounted upon separate brackets —72— which are adjustable forwardly and rearwardly on the main supporting frame as shown more clearly in Fig. 8 and are held in their adjusted position by their clamping bolts —73—.

Secured to the lower end of the drums

—66— is a radially projecting arm —74— carrying at its outer end a pivoted pawl —75— which is normally spring-pressed by spring —76— into engagement with one of a series of notches —77— in the periphery of a circular index plate —78—, the number and spacing of the notches —77— corresponding to the number of teeth of the gear which is to be cut. This index plate is keyed or otherwise secured to the lower end of the gear supporting spindle —30— as shown more clearly in Figs. 5 and 7 and, although removable for replacement of different index plates to conform to gears having different numbers of teeth, it is held in operative position by a nut —79— engaging the lower threaded end of the gear-supporting spindle as shown more clearly in Figs. 5 and 7.

Figure 8:
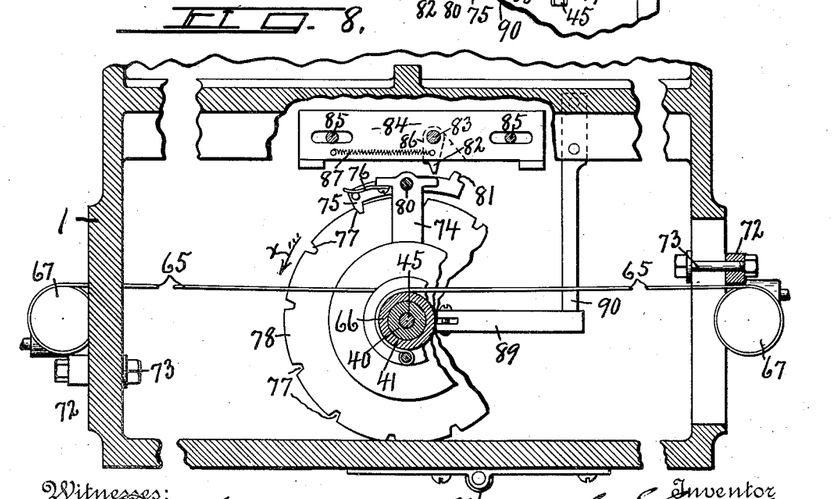
Fig. 8 is a horizontal sectional view taken on line 8—8, Fig. 2, showing more particularly the gear-supporting spindle and means for rotating it as it is moved back and forth relatively to the cutters and showing also the index plate and means for rotating the gear one tooth space at a time.

The heel of the pawl —75—, which is pivoted by a bolt —80— to the outer end of the arm —74—, is provided with an outward projection —81— for engagement with a tripping pawl —82—, the latter being pivoted by a bolt —83— to a bar —84— on a portion of the main supporting frame —1— directly at the rear of the index plate —78— as shown more clearly in Fig. 8, said bar with the tripping pawl —82— thereon being adjustable transversely of the main supporting frame to properly time the tripping of the pawl in cutting gears of different size or pitch and held in adjusted position by clamping bolts —85— as shown more clearly in Figs. 7 and 8.

Figure 16:
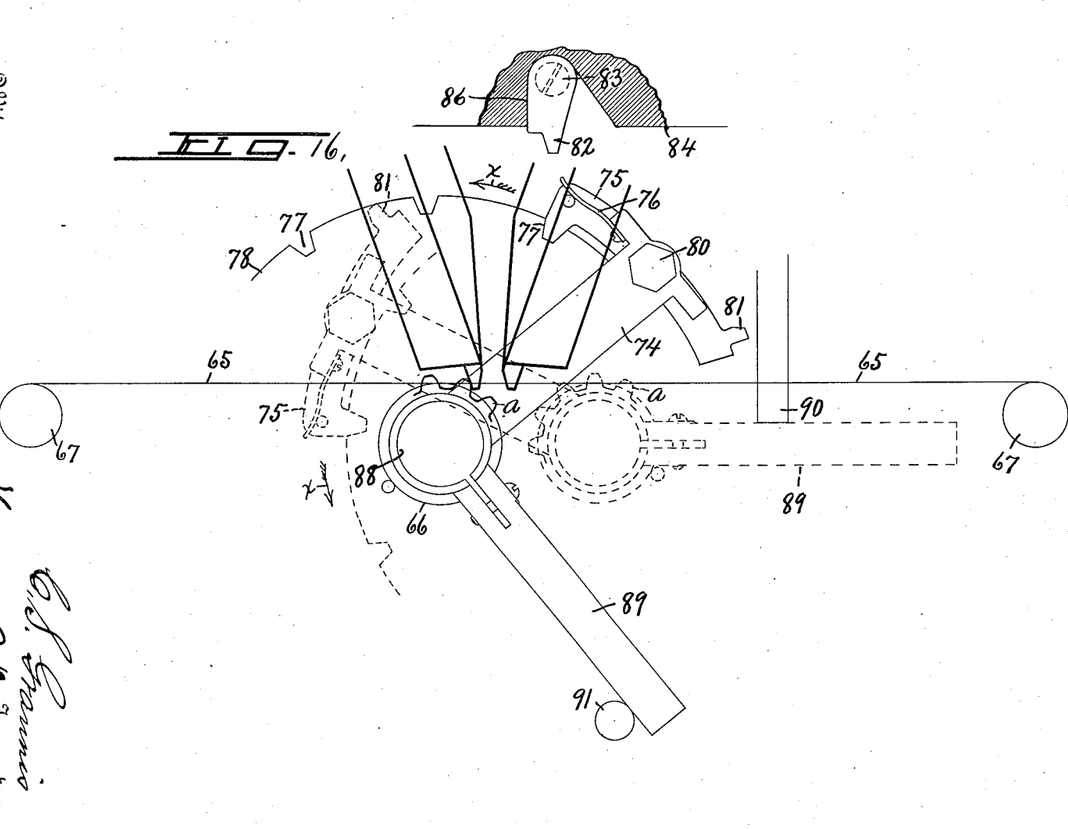
Fig. 16 is a diagrammatic view of the gear-supporting spindle and adjacent portion of the cutter-heads, together with tapes for rotating the spindle and means for effecting the step by step shifting movement of the gear through the medium of the index plate.

The tripping pawl —82— is normally held against an abutment —86—by means of a spring —87— to engage and trip the pawl —75— when it, together with the index plate —78— is moved in the direction indicated by arrow X, Figs. 8 and 16, but is free to move in the opposite direction or away from said abutment when engaged by the shoulder —81— as the pawl and index plate are moved in the opposite direction from that indicated by the arrow.

The index plate is provided with a central pendant hub —88— upon which is frictionally clamped a radially projecting arm —89— capable of turning thereon when held in the manner hereinafter described during the rotation of the index plate but sufficiently tight to rotate therewith when not so held and also capable of holding the index plate while the pawl is being tripped and shifted from one notch to another of said plate for adjusting the gear one tooth space at a time for each cutting operation.

A pair of limiting stops —90— and —91— are mounted upon the main supporting frame in the path of movement of the free end of the arm —89— and are spaced a suitable distance apart circumferentially of such movement to properly gage the degree of circumferential movement of the pawl —75— around the periphery of the index plate to conform to different distances between the notches of different index plates of the same size in accordance with the spacing of the teeth of different gears which are operated upon.

The front end of the limiting stop —90— and face of the arm —89— which is adapted to engage therewith are constructed and arranged so that the rear face of the arm —89— will be substantially parallel with the direction of movement of the tapes —65— when in contact with the stop thereby permitting said arm to slide along the stop in either direction without effecting the rotation of the index plate. The limiting stop —91—, which is mounted upon the front side of the main supporting frame, is adjustable transversely thereof to position the arm —89— at the proper distance from the limiting stop —90— according to the tooth space of the gear or what is the equivalent according to the distance between the notches in the index plate, the support for the limiting stop —91— being held in its adjusted position by clamping bolts —93— shown more clearly in Figs. 1, 2, and 7.

In the diagrammatic view shown in Fig. 16, the gear-supporting spindle, with the gear thereon, is shown by dotted lines in its starting position at the limit of its movement to the right of the cutters while the full lines show the same parts in their extreme position to the left of the cutters, the two positions indicating the degree of throw of the cam —47— and it will be observed that the amount of movement to the right is considerably greater than that to the left of the cutters, the object of which is to allow the teeth of the gear to clear the cutters at each step by step rotary adjustment of such gears. When the gear-supporting spindles are in these extreme positions, the pawl —75— and arm —89— which regulates approximately the movement of the pawl one tooth space at a time will also be in their position shown by dotted lines and by full lines in the same Fig. 16.

The limiting stop —90— is positioned so as to cause the arm —89— to engage therewith at about the same time that the point of the gear tooth being cut leaves the right hand cutters on the return of the gear-supporting spindle toward the right from the position shown by full lines in Fig. —16— and at about the same time or immediately following this engagement of the arm —89— with the stop —90—, the heel —81— of the pawl —75— will have been brought into tripping engagement with the pawl —82— to trip the pawl —75— out of interlocking engagement with the index plate —78— whereupon the continued return movement of the gear-supporting spindle to the position shown by dotted lines in Fig. 16 will cause the bar —89— to frictionally hold the index plate against turning while the bar —89— simply slides along across and in contact with the limiting stop —90— and parallel with the tapes —65— and at the same time, the arm —74— with the pawl —75— thereon will have been moved circumferentially a distance equal to or slightly greater than one tooth space or sufficient to cause said pawl to engage in the next succeeding notch of the index plate as shown by dotted lines in Fig. 16, it being understood that while the index plate and gear-supporting spindle with the gear thereon are being frictionally held by the engagement of the arm —89— with the limiting stop —90—, the tape drum to which the arm —74— is secured is free to continue its rotation to the left to effect the shifting of the pawl —75— one notch space in the manner just previously described.

*Operation.*—For example, assuming that the parts are in the position shown in Fig. 16 and that the dotted lines represent the starting position of the gear and pawl, then while the gear is being moved bodily to the left and before it reaches the cutting edge of the right hand cutter-head, a rolling motion will be imparted to the gear through the medium of the right hand tape, thereby rocking the arm —89— forwardly and to the left into engagement with the limiting stop —91—, which is adjusted so as to limit the rocking movement of said arm —89— to the left during the movement of the gear —a— from its starting position to a point ready to contact with the cutters of the right hand cutter-head, it being understood that when the arm —89— is engaged by the limiting stop —90—, it is turned upon the hub of the index plate as the gear continues its movement to the left across and into cutting engagement with knives of the cutter-heads. That is, after the arm —89— encounters the limiting stop —91—, the cam —47— causes a continued movement of the gear blank across and to the left of the cutter-heads to the position shown by full lines in Fig. 16, the tape —65— effecting a rolling movement of the gear spindle and gear thereon during such continued movement. This shifting movement of the gear-supporting spindle and its gear from the position shown by dotted lines to the position indicated by full lines causes the arm —74— to rock from its extreme left hand position shown by dotted lines to the right of the position shown by full lines, the heel —81— of the pawl operating to force the pawl —82— out of its path. During the return movement of the gear, the left hand tape —65— imparts a reverse rolling movement thereto thereby causing the arm —74— to rock rearwardly to the left until the arm —89— encounters the limiting stop —90— and the heel —81— of the pawl —75— engages the tripping pawl —82— and trips said pawl —75— in the manner previously described thereby allowing the said pawl —75— to advance into engagement with the next succeeding notch in the index plate while the latter is being frictionally held by the arm —89—, this advance of the pawl one tooth space while the index plate and gear-supporting spindle with the gear thereon are at rest causes said gear to be rotated one tooth space to the right while moving from its starting position into cutting engagement with the cutter of the right hand cutter head.

The operation and functions of the various other mechanisms of the machine have been previously described.

What I claim is:

1. In a gear-cutting machine, a rotary cutter and means for supporting and rolling a gear blank in a straight line at right angles to its axis along a plane tangential to the pitch-circle of the gear and intersecting the cutting edges of the cutter.

2. In a gear-cutting machine, a pair of rotary gear cutters arranged end to end with their axes disposed at an angle to each other and their adjacent faces spaced apart to receive one tooth and means for supporting and rolling a gear blank along a plane tangential to the pitch-circle of the gear blank and intersecting cutting edges of the gear cutter.

3. In a gear-cutting machine, a supporting spindle for a gear blank, means for reciprocating said spindle radially in parallelism with its axis, additional means coacting with the first named means for rotating the spindle and thus imparting a rolling motion to the gear blank along a plane tangential to the pitch-circle of the gear and parallel to the plane of movement of the spindle, a pair of rotary gear cutters having their cutting edges intersecting said plane, and means for rotating the cutters.

4. In a gear-cutting machine, a rotary spindle for a gear blank, means for reciprocating the spindle radially along a straight line, coöperative means for rotating the spindle and rolling its gear blank in reverse directions along a plane tangential to the pitch-circle of the gear as the spindle is reciprocated, and rotary gear cutters having their cutting edges intersecting said plane and means for rotating the cutters.

5. In a gear-cutting machine, a rotary spindle for a gear blank, means for reciprocating the spindle radially along a straight line, coöperative means for rotating the spindle and rolling its gear blank in reverse directions along a plane tangential to the pitch-circle of the gear as the spindle is reciprocated, rotary gear cutters having their cutting edges intersecting said plane, means for rotating the cutters, and separate devices for adjusting the cutter-heads to different angles.

6. In a gear-cutting machine, a rotary spindle for a gear blank, means for reciprocating the spindle radially in a straight line, coöperative means for rotating the spindle and rolling its gear blank in reverse directions along a plane tangential to the pitch-circle of the gear as the spindle is reciprocated, rotary gear cutters having their cutting edges intersecting said plane, means for rotating the cutters, and separate devices for adjusting the cutter-heads toward and from the axes of the gear-supporting spindle.

7. In a gear-cutting machine, means for rolling a gear blank in parallelism and in reverse directions along a plane tangential to the pitch-circle of the gear, rotary gear cutters having their cutting edges intersecting said plane, means for rotating the cutters, separate devices for adjusting the cutter-heads toward and from the axes of the gear-supporting spindle and additional devices for adjusting the cutter-heads to different angles.

8. In a gear-cutting machine, a pair of rotary cutter-heads disposed at an angle to each other, supports for the cutter-heads, a gear-supporting spindle for a gear blank, mechanism for moving the spindle parallel with its axis in a plane at right angles to a medial plane between the cutter-heads, and coöperative mechanism for rolling said gear-supporting spindle along a plane tangential to the pitch-circle of the gear.

9. In a gear-cutting machine, a rotary gear-supporting spindle, a pair of rotary gear cutters, and separate devices for adjusting them to different angles relatively to each other about different centers.

10. In a gear-cutting machine, a rotary gear-supporting spindle, a pair of rotary cutter-heads disposed at an angle to each other and having their active meeting faces spaced one gear tooth apart, and separate devices for adjusting said heads toward and from the gear-supporting spindle.

11. In a gear-cutting machine, a gear-supporting spindle, and a pair of rotary cutter-heads arranged at an angle to the tangent of the side of the gear adjacent the cutter-heads and having their active meeting faces spaced one gear tooth apart.

12. In a gear-cutting machine, a rotary gear-supporting spindle, separate rotary cutter-heads arranged end to end at an angle to each other and having their active meeting faces spaced one gear tooth apart, and separate devices for adjusting said heads toward and from each other.

13. In a gear-cutting machine, a rotary gear-supporting spindle, separate cutter-heads and separate supports therefor pivoted at opposite sides of a medial plane between the heads for adjusting the cutter-heads to different angles relatively to each other.

14. In a gear-cutting machine, a main supporting frame, a carriage slidable on the frame, means for reciprocating the carriage, a gear-supporting spindle mounted on the carriage and provided with concentric bearings of the same diameter as the pitch diameter of the gear, means engaging said bearings for rotating the spindle in reverse directions as the carriage is reciprocated, and a pair of cutter-heads having their cutting sides intersecting a tangent to the pitch-circle of the gear.

15. In a gear-cutting machine, a pair of gear-cutting heads arranged end to end at an angle to each other and having their active meeting faces spaced one gear tooth apart, a carriage movable at right angles to a medial plane between the cutter-heads, means for reciprocating the carriage, a gear-supporting spindle mounted on the carriage and means connected to the spindle for rolling the gear-supporting spindle along a plane tangential to the gear at the side thereof adjacent the cutter-heads.

16. In a gear-cutting machine, a main supporting-frame, a carriage slidable thereon, means for reciprocating the carriage, a gear-supporting spindle mounted on the carriage, tape drums loose on the spindle and secured to each other, the diameter of the tape drums being the same as the pitch diameter of the gear to be cut, movable means for locking the tape drums to the spindle, tapes having one end reversely wound upon the drums and extending in opposite directions therefrom tangential thereto, separate devices for holding the opposite ends of the tapes, and a pair of rotary cutter-heads for cutting the gear blank.

17. In a gear-cutting machine, a pair of rotary gear-cutters arranged end to end at an angle to each other, a rotary gear-supporting spindle for carrying a gear blank in the plane of the axes of the cutters, means for moving the gear-supporting spindle bodily back and forth across the face of the cutters at right angles to a medial plane between said cutters, tape drums loose on the gear-supporting spindle, movable means for locking the tape drums to the spindle, the diameter of the tape drums being the same as the pitch-circle of the gear to be cut, tapes having their inner ends reversely wound upon the drums, and means attached to the opposite ends of the tapes for tightening them.

18. In a gear-cutting machine, gear cutting means, a rotary gear-supporting spindle, a reciprocatory carriage for the spindle having a stud on the carriage, a rotary cam engaging said stud for reciprocating the carriage, and driving means for the cam including two members, one of which is movable into and out of engagement with the other to permit the cam to be operated manually.

19. In a gear-cutting machine, a pair of rotary cutters arranged end to end, a gear-supporting spindle for carrying a gear blank in the plane of the axes of the cutters, a carriage for the spindle movable at right angles to a medial plane between the cutters, means for reciprocating the carriage, tape drums loose on the spindle, movable means for locking the tape drums to the spindle, the diameter of the tape drums being the same as the pitch diameter of the gear to be cut, tapes having their inner ends reversely wound upon the tape drums and extending in opposite directions tangential thereto, separate tightening devices for the opposite ends of the tapes, means for tripping the locking means during a portion of the reciprocating movement of the carriage, and additional means to hold the gear-supporting spindle against rotation while the locking means is tripped.

In witness whereof I have hereunto set my hand this 10th day of August 1912.

CHARLES S. GRANNIS.

Witnesses:
H. E. CHASE,
E. E. GREENLEAF.